Patented Sept. 26, 1939

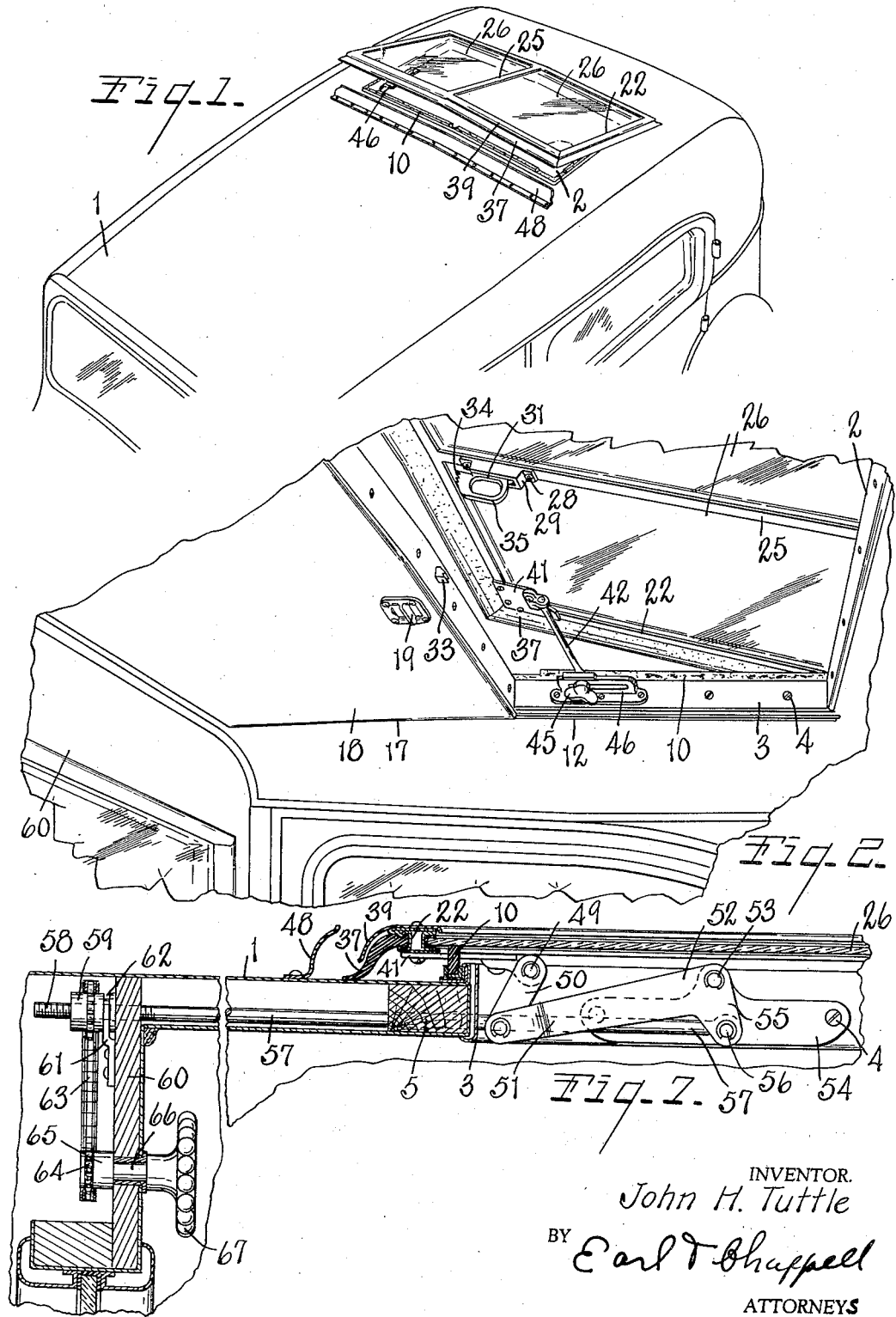

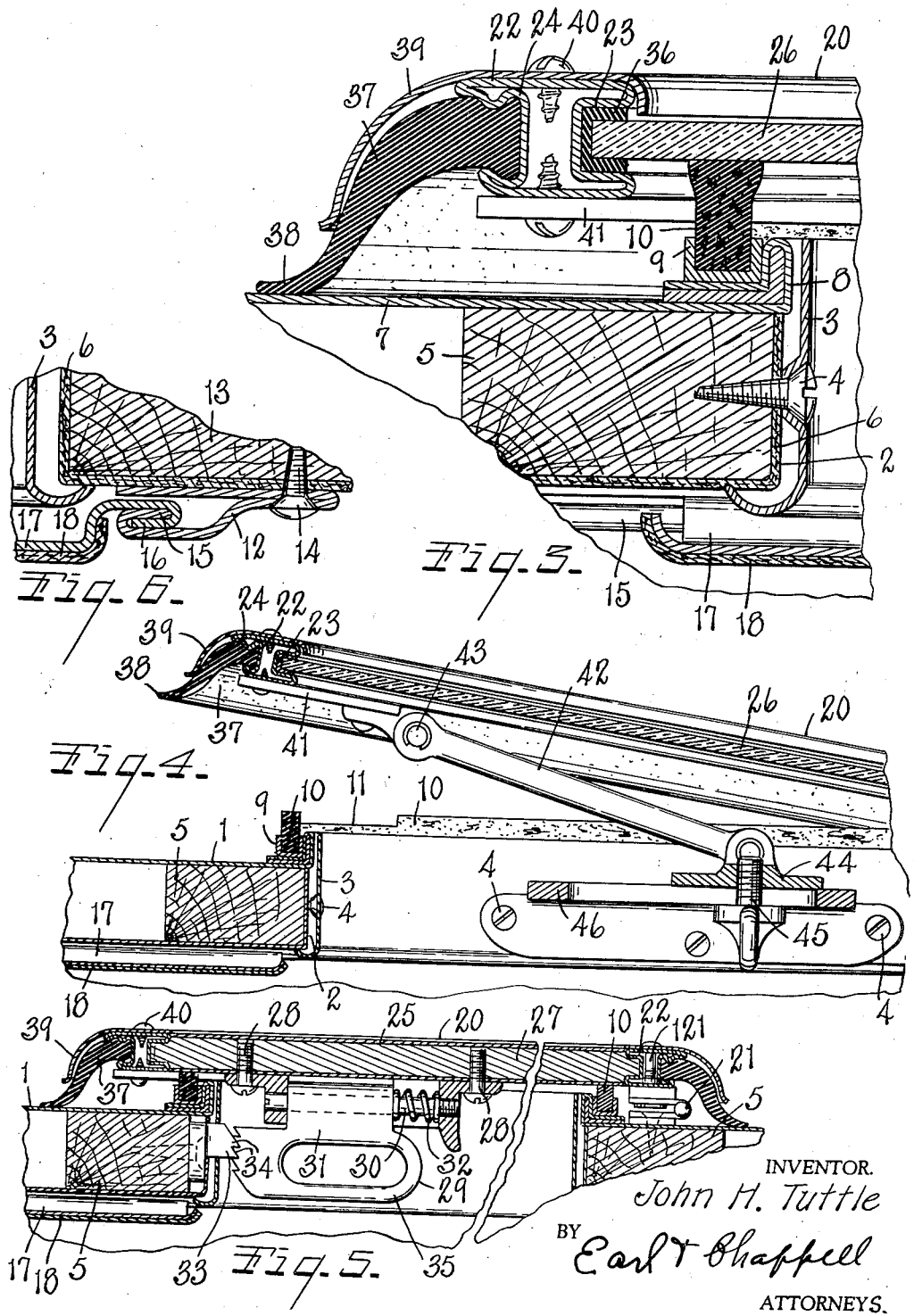

2,173,890

UNITED STATES PATENT OFFICE 2,173,890

ROOF VENTILATOR FOR CABS

John H. Tuttle, Kalamazoo, Mich., assignor to Checker Cab Manufacturing Corporation, Kalamazoo, Mich.

Application December 19, 1936, Serial No. 116,761

10 Claims. (Cl. 98—2)

This invention relates to improvements in roof ventilators for cabs.

The main objects of my invention are:

First, to provide an adjustable roof ventilator for closed vehicles, such as taxicabs, capable of being readily opened or closed at will.

Second, to provide a structure of the type described which may be elevated to admit fresh air to the interior of a vehicle compartment through the opening covered by the same or which may be closed, and in closed position tightly and hermetically seal the cab from the weather.

Third, to provide a device of the type described which is easily manipulated, economical of production, and which has a pleasing appearance.

Further objects relating to details and economies of my invention will definitely appear from the description to follow. The invention is defined in the claims.

A preferred embodiment of my invention is illustrated in the accompanying drawings, wherein:

Fig. 1 is a fragmentary exterior perspective view illustrating the roof of a vehicle having my invention embodied therein, the ventilator being open.

Fig. 2 is a fragmentary perspective interior view of the roof of the cab and illustrating the arrangement and details of my invention, the ventilator being open.

Fig. 3 is an enlarged fragmentary view in longitudinal section illustrating structural details, the ventilator being closed.

Fig. 4 is a further fragmentary view in longitudinal section illustrating details of my ventilator and the elevating mechanism employed therewith, the ventilator being open.

Fig. 5 is an enlarged fragmentary view in longitudinal section illustrating details of my ventilator and the latch mechanism employed for securing the same in closed position.

Fig. 6 is a fragmentary view in transverse section illustrating the construction of the concealing panel or blind constituting an element of my invention.

Fig. 7 is a fragmentary view in longitudinal section illustrating a modified form of ventilator control or adjusting means.

In closed vehicles such as taxicabs, it is desirable to provide ventilating means whereby fresh air may be led to the interior of the same to relieve the unpleasant stuffiness in the passenger's compartment in hot weather. Similarly, it is desirable to provide a ventilator of transparent nature whereby sunlight may be admitted to the interior of the cab and the transparent ventilator cover, which I accordingly employ, is still further of value inasmuch as it facilitates sightseeing in large cities, which is rendered impossible or exceedingly difficult in the case of vehicles having conventional roofs.

An important characteristic of my ventilator is that it is efficiently sealed against the entrance of rain, cold air, or dust.

Referring to the drawings, reference numeral 1 indicates the roof of an enclosed vehicle such as a taxicab wherein my invention preferably finds application, although I do not wish to be unduly limited in this respect as my inventive structure may be utilized in connection with the roof of any vehicle compartment. The roof is provided with an opening 2 preferably rectangular in form, although its shape and size may be altered as desired. The opening is surrounded by a garnish molding 3 of sheet metal, the same being secured by screws 4 to the deck or frame 5 of wood or metal outlining the opening and forming a part of the framework of the roof. The screws 4 and the flanged lower edge of the molding 3 likewise secure the upholstery 6 around the ventilator frame 5.

The reference numeral 7 indicates the roof covering of the vehicle, having an opening registering with the opening outlined by the ventilator frame and being formed to provide a reinforced upstanding bead generally indicated 8, surrounding the opening. Surrounding the bead 8, I dispose an upwardly facing channel 9 and in this channel I secure an annular gasket or packing 10 of yielding rubber or other sealing material adapted to make a leakproof joint or seal, the gasket or packing being provided with recesses 11 for a purpose to be hereinafter described.

Interiorly of the cab of the vehicle, I mount a track or slideway 12 extending longitudinally of the vehicle as indicated in Fig. 6, the track being secured to the roof framework 13 by screws 14. Track 12 includes a reversely bent lip 15 which receives the reversely turned edge 16 of a sheet metal screen or shade 17 which is adapted to be shifted into a position to cover opening 2 or retracted into the position indicated in Figs. 2, 4 and 5. A track or slideway 12 is provided on each side of the ventilator opening.

The sliding screen 17 is suitably covered by upholstery 18 and a fingerpiece 19 is mounted thereon to enable the same to be conveniently shifted as desired.

Referring now to Fig. 5, I provide a ventilator cover generally indicated by the reference numeral 20 which is pivotally mounted on the vehicle top by a hinge 21 screwed into the frame and extending transversely of the opening 2 at the rear thereof. The hinge is secured to the ventilator cover by a bolt 121.

The ventilator cover comprises a sheet metal frame 22 of tubular stock in a corresponding size and shape to the opening 2 and provided with opposed annular side channels for a purpose to be described, the innermost of which channels is designated 23 and the outermost 24. I preferably employ a cross piece 25 as illustrated in Figs. 1, 2 and 5, dividing the ventilator cover centrally and likewise having opposed side channels (not shown) which in cooperation with channel 23 receives panes 26 of plate glass. I reinforce cross piece 25 internally with a filler 27 drilled to receive screws 28 for securing a latch slide 29 to the ventilator cover. The latch slide carries a rod 30 upon which is slidably mounted a latch member 31, a coil spring 32 encircling the rod and normally urging the latch member forwardly into engagement with a keeper 33 secured to the ventilator frame 5. The latch member and keeper carry coacting teeth 34 and the latch member is provided with a handle grip 35 for manipulation of the same.

Gasket 10 is suitably recessed to accommodate cross piece 25 and when the ventilator cover is in closed and latched position, as illustrated in Figs. 3 and 5, the gasket is compressed to provide a weather-tight seal. Suitable U-shaped rubber packings 36 surround the individual panes of glass 26 to mount them in channel 23 in the tubular ventilator cover frame. These packings not only provide a weather-tight seal but also prevent rattling.

In channel 24 in the tubular ventilator cover frame 22, I mount an annular rubber outer sealing skirt 37, preferably continuous and jointless in nature and having a depending outwardly flared flexible sealing lip 38 which is deformable when the ventilator or cover is drawn into closed position to effectively seal the same exteriorly. A sheet metal annular restraining finish molding 39 is secured to the top of tubular ventilator frame by screws 40 to depend downwardly over skirt 37 and engage the latter when compressed against the roof and thereby limit deflection of the skirt under such compression.

To the bottom of the tubular frame 22, I mount a plate 41 to which the operating structure for the ventilator is connected. The operating structure consists of a link 42 pivotally mounted to plate 41 on a stud 43 and to a slide 44 which receives a thumb screw 45 and is mounted by the same for adjustable sliding movement in a slotted bracket 46 screwed to the ventilator frame interiorly of the cab. It will be apparent that the ventilator cover may be secured in raised position by tightening the thumb screw 45. In closed position of the ventilator cover, plate 41 is received in recess 11 formed in gasket 10.

For the purpose of eliminating a direct draft in the interior of the passenger compartment when cover 20 is elevated and to further seal the ventilator when it is closed, I provide an upstanding transverse shield or baffle 48 of sheet metal which may be suitably ornamented and which acts as a deflector as illustrated in Figs. 1 and 7. The shield or baffle is suitably attached to the roof of the vehicle.

In Fig. 7, I illustrate a modified form of elevating or operating means for the ventilator cover. This comprises a pivot stud 49 secured to plate 41, to which stud a link 50 is pivotally connected. The link at its other end is pivotally connected to the long arm 51 of a bell crank lever 52 which is in turn pivotally mounted at 53 on a bracket 54 secured to the ventilator frame. The short arm 55 of the bell crank lever is pivotally connected at 56 with a longitudinally shiftable rod 57. By shifting rod 57 longitudinally, the bell crank lever 52 will be rotated about its pivot point to elevate the ventilator cover through link 50. To accomplish the longitudinal shifting of rod 57 easily and quickly, I provide the end thereof with screw threads 58 engaging a nut or internally threaded collar 59 held in fixed position relative to the partition 60 through which the rod extends by means of a forked element 61 secured to the partition and engaging the annular groove 62 in collar 59. The collar is provided with sprocket teeth on its exterior for coaction with a chain 63 and the chain likewise surrounds sprocket wheel teeth 64 formed on a rotating collar 65 which is fixedly mounted on a shaft 66 adapted to be turned by hand wheel 67. It will be clear that by turning hand wheel 67, the collar 59 will rotate, and since the collar is fixedly mounted axially, rod 57 will be caused to travel in one or another direction longitudinally, whereby the ventilator cover is raised or lowered.

From the foregoing description, the merits of my invention will be clear. I have provided a roof ventilator structure which is simple in operation and which opens substantially to allow the ingress of fresh air and which when closed causes the interior to be as well sealed as far as the roof of the cab is concerned as if there were no ventilator structure employed at all. The sliding screen may be drawn over the ventilator opening 2, completely covering the same so that the appearance of the interior of the cab is not affected by the provisions of my invention. My device possesses the advantage that the transparency of the ventilator cover admits light and sunshine to the interior of the cab and greatly facilitates sightseeing, a feature of considerable importance.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a roof ventilator structure for vehicles, an upwardly facing annular channel surrounding an opening in the roof of the vehicle, a continuous rubber gasket in said channel, and a ventilator cover hinged to said roof and opening forwardly, said cover comprising a tubular frame member, a pane of glass mounted within said member, an annular depending rubber sealing apron carried by said member around its outer periphery and adapted to be compressed into sealing engagement against the roof exteriorly of said gasket, said pane compressing said gasket to provide a further inner seal, and restraining means carried by said cover and extending over said apron to engage the same and prevent undue deflection thereof when compressed.

2. In a roof ventilator structure for vehicles, an annular channel surrounding an opening in the roof of the vehicle, a gasket in said channel, a ventilator cover hinged to said roof and opening forwardly, said cover comprising a tubular frame member, an annular depending sealing apron carried by said member around its outer periphery and having an outwardly curved sealing lip adapted to be compressed into sealing engagement against the roof exteriorly of said gasket, said cover compressing said gasket to provide a further inner seal, and a restraining member engaging said skirt to limit deflection thereof under compression.

3. In a roof ventilator structure for vehicles, an annular compressible gasket surrounding an opening in the roof of the vehicle, and a ventilator cover hinged to said roof, said cover comprising a tubular frame member, a pane of glass mounted within said member and an annular depending sealing apron carried by said member around its outer periphery and having an outwardly curved sealing lip adapted to be compressed into sealing engagement against the roof exteriorly of said gasket, said cover compressing said gasket to provide a further inner seal.

4. In a roof ventilator structure, a ventilator cover adapted to close an opening in the roof of a vehicle, being pivoted adjacent the opening, said cover having a transparent panel and an outer peripheral depending rubber sealing skirt adapted to be depressed against said roof when the cover is closed, a continuous yieldable gasket on said roof surrounding said opening and compressible by the cover in closed position, means to limit deflection of said skirt under depression, and means to secure the cover in closed position.

5. In a roof ventilator structure, a ventilator cover adapted to close an opening in the roof of a vehicle, being pivoted adjacent the opening, said cover having an outer peripheral depending rubber sealing skirt adapted to be depressed against said roof when the cover is closed, means to limit deflection of the skirt when depressed, a continuous yieldable gasket on said roof surrounding said opening and compressible by the cover in closed position, and an upstanding shield on the roof in front of the opening and extending transversely across the roof.

6. In a roof ventilator structure, a ventilator cover adapted to close an opening in the roof of a vehicle, being pivoted adjacent the opening, said cover including a transparent panel and an outer peripheral depending resilient and laterally flexible sealing skirt adapted to be depressed against said roof when the cover is closed, and a gasket on said roof surrounding said opening and compressible by the cover in closed position.

7. In a roof ventilator structure, a ventilator cover adapted to close an opening in the roof of a vehicle, said cover including a transparent panel and a depending resilient sealing skirt adapted to be depressed against said roof when the cover is closed, and further resilient sealing means on said roof surrounding said opening and engageable and compressible by the panel in closed position.

8. In a roof ventilator for the passenger compartment of a vehicle, a ventilator cover adapted to close an opening in the roof communicating with said compartment, means pivotally mounting said cover on said roof, said cover having a depending sealing skirt adapted to be compressed against the roof, an annular upwardly facing channel on said roof surrounding said opening, and a gasket in said channel, said gasket being compressed by said cover when the cover is closed.

9. In a roof ventilator for the passenger compartment of a vehicle, a ventilator cover adapted to close an opening in the roof communicating with said compartment, means mounting said cover on said roof, said cover having a depending resilient sealing skirt adapted to be compressed against the roof, means for limiting deflection of the skirt under compression, an annular upwardly facing channel on said roof surrounding said opening, and a gasket in said channel, said gasket being compressed by said cover when the cover is closed.

10. In a roof ventilator for the passenger compartment of a vehicle, a ventilator cover adapted to close an opening in the roof communicating with said compartment, means pivotally mounting said cover on said roof, said cover having a depending peripheral deformable sealing skirt adapted to be compressed against the roof, and means carried by the cover and engageable with the skirt to limit deformation thereof under compression.

JOHN H. TUTTLE.